US007696718B2

(12) United States Patent  (10) Patent No.: US 7,696,718 B2
Suzuki  (45) Date of Patent: Apr. 13, 2010

(54) CHARGING APPARATUS AND CHARGING SYSTEM

(75) Inventor: Katsuya Suzuki, Gunma (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 217 days.

(21) Appl. No.: 11/463,444

(22) Filed: Aug. 9, 2006

(65) Prior Publication Data

US 2007/0069687 A1  Mar. 29, 2007

(30) Foreign Application Priority Data

Sep. 29, 2005  (JP)  ............... 2005-284500

(51) Int. Cl.
*H02J 7/00*  (2006.01)
(52) U.S. Cl. ............... 320/108; 320/106; 320/112; 320/113; 320/165
(58) Field of Classification Search ............... 320/108, 320/106, 165, 161, 162, 103, 107, 112, 113
See application file for complete search history.

(56) References Cited

U.S. PATENT DOCUMENTS

| 5,734,254 | A | 3/1998 | Stephens |
| 6,184,651 | B1 | 2/2001 | Fernandez et al. |
| 6,844,702 | B2 * | 1/2005 | Giannopoulos et al. ..... 320/108 |
| 2004/0142733 | A1 | 7/2004 | Parise |
| 2004/0145342 | A1 * | 7/2004 | Lyon ............... 320/108 |
| 2004/0245348 | A1 | 12/2004 | Nagaoka et al. |
| 2006/0184705 | A1 | 8/2006 | Nakajima |

FOREIGN PATENT DOCUMENTS

| EP | 0 533 247 A1 | 3/1993 |
| EP | 0 829 940 A2 | 3/1998 |
| EP | 1 280 099 A1 | 1/2003 |
| GB | 2 292 866 A | 3/1996 |
| GB | 2 394 843 A | 5/2004 |
| GB | 2 422 517 A | 7/2006 |
| JP | 2001-351081 | 12/2001 |
| JP | 2002-34169 | 1/2002 |
| JP | 2002-369394 | 12/2002 |
| JP | 2005-143181 | 6/2005 |
| JP | 2005-237155 | 9/2005 |

\* cited by examiner

*Primary Examiner*—Edward Tso
*Assistant Examiner*—Alexis Boateng
(74) *Attorney, Agent, or Firm*—Oblon, Spivak, McClelland, Maier & Neustadt, L.L.P.

(57) ABSTRACT

Disclosed is a charging apparatus for charging a secondary battery incorporated in a portable electronic device. The charging apparatus includes a contactless IC card reader configured to supply operating power to a contactless IC card unit incorporated in the portable electronic device and have an authentication function of authenticating that an object to be authenticated is a correct one, a charging circuit configured to perform contactless charging of the secondary battery, and a control unit configured to activate the charging circuit if an authentication result is OK after the contactless IC card reader authenticates an object to be authenticated when the object to be authenticated is placed.

12 Claims, 3 Drawing Sheets

CHARGING APPARATUS AND CHARGING SYSTEM

CROSS REFERENCES TO RELATED APPLICATIONS

The present invention contains subject matter related to Japanese Patent Application JP 2005-284500 filed in the Japanese Patent Office on Sep. 29, 2005, the entire contents of which being incorporated herein by reference.

BACKGROUND OF THE INVENTION

1. Field of the Invention

The present invention relates to a charging apparatus and a charging system for a portable electronic device.

2. Description of the Related Art

A portable electronic device such as a cellular phone obtains its operating power from a secondary battery and it is necessary to charge the secondary battery periodically.

In current cellular phones, contact charging is mainly performed in which an AC adapter is directly connected to the connector of a cellular phone or the exposed electrode of the phone is brought into contact with a terminal portion provided on a charging stand. In the contact charging, there appears to be a phenomenon of a charging failure due to contamination of a metal portion as an electrical contact or poor contact of a connector portion.

On the other hand, contactless charging, that is, charging without an electrical contact is performed using a mechanism in which power is transferred from a primary side to a secondary side by the magnetic induction of coils. In general, by only putting a device such as a phone as the secondary side on a charging stand as the primary side, it is possible to configure a charging circuit without a metal contact. Such contactless charging is employed in a cordless phone, a watch, an electric toothbrush, and the like.

The problem of the contactless charging is that when a metallic foreign object (e.g., coin) in place of a correct device is put on the charging stand, eddy currents induced by electromagnetic induction may cause the heating of the foreign object. In order to avoid this problem, there is proposed a method, such as described in Japanese Patent Application Laid-Open No. 2002-34169, for changing a charging load in a predetermined pattern by turning on/off a charging control transistor for charging a secondary battery and detecting whether or not the object put on the charging stand is a correct device by detecting at the charging stand side this change.

SUMMARY OF THE INVENTION

In the related art, there is a problem that the charging stand consumes much power because a circuit for detecting a foreign object always operates. Further, since the verification of whether the object put on the charging stand is a foreign object or a correct device is conducted on the basis that a certain amount of electricity remains in a battery of a device to be charged, there is a problem that the above verification operation is not performed if the amount of electricity remaining in the battery is extremely small.

In view of the above circumstances, in an embodiment according to the present invention, there is provided a charging apparatus and a charging system that can exclude the possibility of an electrical-contact failure and charge only a correct electronic device irrespective of the remaining battery life of the device to be charged.

A charging apparatus in an embodiment according to the invention is a charging apparatus for charging a secondary battery incorporated in a portable electronic device having a contactless IC card unit. The charging apparatus includes a contactless IC card reader configured to supply operating power to the contactless IC card unit and have an authentication function of authenticating that an object to be authenticated is a correct one, a charging circuit configured to perform contactless charging of the secondary battery, and a control unit configured to activate the charging circuit if an authentication result is OK after the contactless IC card reader authenticates an object to be authenticated when the object to be authenticated is placed.

The charging apparatus can determine a correct portable electronic device by using the function of authenticating a contactless IC card, and the control unit activates the charging circuit only for a correct portable electronic device. Thus, it is possible to prevent improper activation for a foreign object. Further, the contactless IC card unit incorporated in the portable electronic device operates by receiving operating power from the contactless IC card reader side of the charging apparatus, regardless of the amount of electricity remaining in the secondary battery to be charged.

The charging apparatus preferably further includes a power supply circuit configured to supply operating power to the contactless IC card reader, and a detection unit configured to detect that an object to be authenticated is placed on the charging apparatus. In the charging apparatus, the control unit deactivates the power supply circuit while an object to be authenticated is not placed on the charging apparatus and activates the power supply circuit while an object to be authenticated is placed on the charging apparatus, based on a result detected by the detection unit.

A charging system in an embodiment according to the invention includes such a charging apparatus and a portable electronic device incorporating a secondary battery to be charged.

In an embodiment according to the invention, an electrical-contact failure does not occur due to contactless charging, and it is possible to detect a correct cellular phone due to authentication with a contactless IC card unit, irrespective of the remaining battery life of the cellular phone, thereby making it possible to avoid supplying power to a foreign object in error.

Further, since authentication of a contactless IC card unit is performed when a cellular phone is physically put on the charging stand, it is not necessary to always consume power to determine a foreign object before the start of charging, thus making it possible to reduce the power consumption of the charging stand.

After the start of charging, the contactless IC card reader is controlled into a low-power mode. Alternatively, if a foreign object is put on the charging stand, power is not supplied to the foreign object. Thereby, it is possible to reduce the power consumption of the charging stand.

BRIEF DESCRIPTION OF THE DRAWINGS

Embodiments of the present invention will be described in detail based on the following figures, wherein.

DESCRIPTION OF THE PREFERRED EMBODIMENTS

Hereinafter, a preferred embodiment of the present invention will be described in detail with reference to the accompanying drawings.

Figure 1:
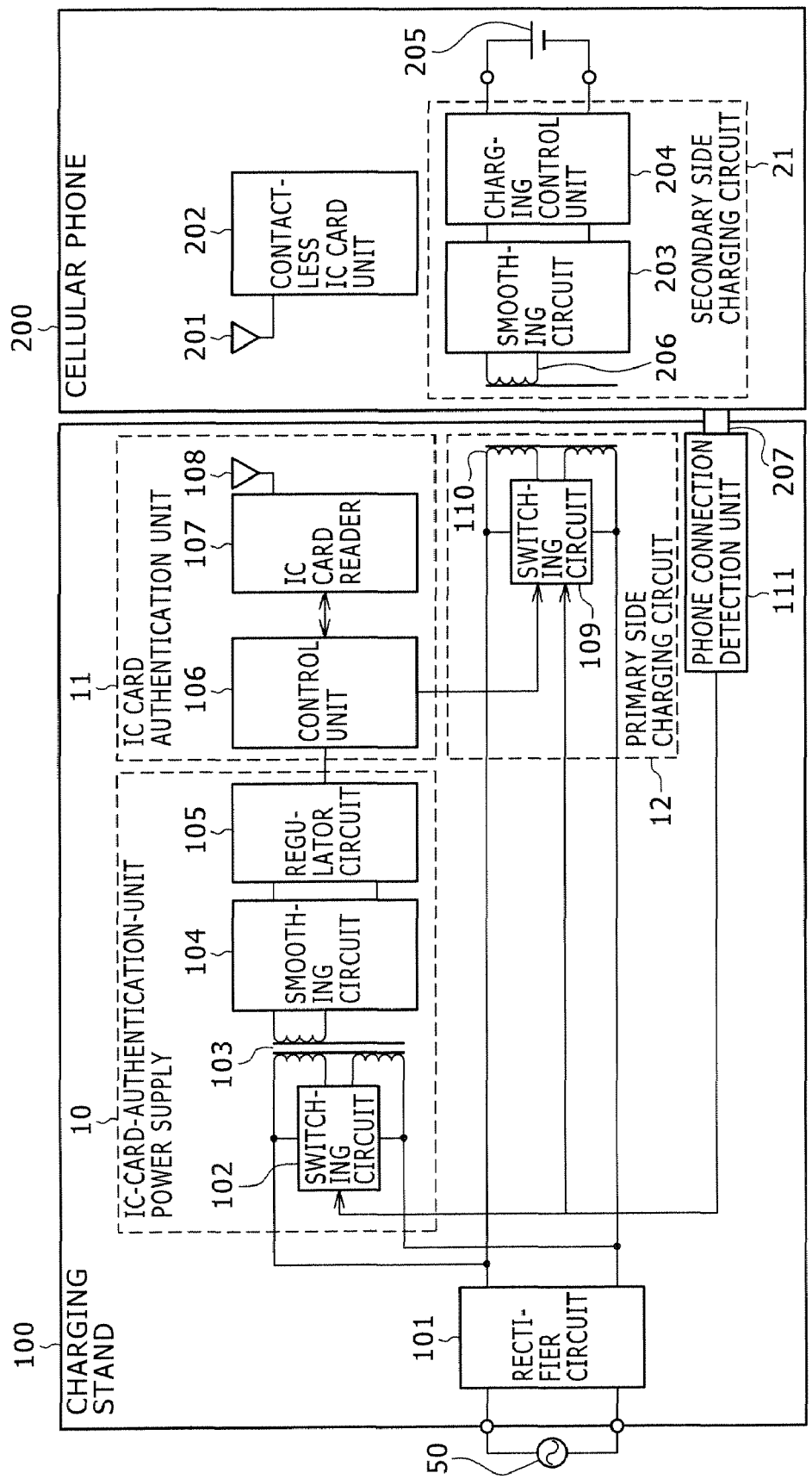
FIG. 1 is a block diagram showing an example of the configuration of a charging system in an embodiment according to the invention.

FIG. 1 is a block diagram showing an example of the configuration of a charging system in an embodiment according to the invention. The charging system represents a cellular phone 200 which is an example of portable electronic devices at the charged side and a charging stand 100 which is a charging apparatus at the charging side.

The charging stand 100 includes a rectifier circuit 101 which is connected to a commercial power source 50 and rectifies AC voltage, a contactless IC card authentication unit 11 which authenticates a contactless IC card unit described above, a contactless-IC-card-authentication-unit power supply 10 which is connected to the output of the rectifier circuit 101 and supplies power to the contactless IC card authentication unit 11, a primary side charging circuit 12 which is connected to the output of the rectifier circuit 101, a phone connection detection unit 111 which detects whether or not the cellular phone 200 is connected to the charging stand 100, a projection 207 which is provided on the phone connection detection unit 111.

The contactless-IC-card-authentication-unit power supply 10 includes a switching circuit 102 which performs switching control of voltage obtained from the rectifier circuit 101, a transformer 103 of which primary coil is driven by the switching circuit 102, a smoothing circuit 104 which is connected to the secondary coil of the transformer 103, and a regulator circuit 105 which is connected to the smoothing circuit 104 and stabilizes voltage to generate optimum operating voltage.

The contactless IC card authentication unit 11 includes a control unit 106 which operates by obtaining operating power from the regulator circuit 105, a contactless IC card reader 107 which operates under the control of the control unit 106 and reads data from a contactless IC card unit 202, and an antenna 108 which is connected to the contactless IC card reader 107 and used for communication with the contactless IC card unit 202 incorporated in the cellular phone 200. The contactless IC card authentication unit 11 determines (authenticates) whether or not the contactless IC card unit 202 is a correct one by performing predetermined communication with the contactless IC card unit 202. The authentication can be performed utilizing an authentication function adopted in an existing technique of a contactless IC card.

The primary side charging circuit 12 includes a switching circuit 109 which performs switching control of voltage obtained from the rectifier circuit 101 and a coil 110 which transfers power by the control of the switching circuit 109.

At the other end, the cellular phone 200 includes an antenna 201 which is used for communication with the charging stand 100 through the antenna 108, the contactless IC card unit 202 which is connected to the antenna 201 and exercises the capabilities of a contactless IC card, a secondary side charging circuit 21 which is electro magnetically coupled to the primary side charging circuit 12 of the charging stand 100, and a secondary battery 205 which is charged by the secondary side charging circuit 21, in a block related to contactless charging.

When the cellular phone 200 is put on the charging stand 100 correctly, the projection 207 is pressed by the enclosure of the phone, thereby turning on the switch of the phone connection detection unit 111. While the projection 207 and the phone connection detection unit 111 constitute a detection device in an embodiment according to the invention, the structure of a detection device is not limited to such a mechanical device. For example, an optical or electromagnetic detection device may be used.

With this structure, the switching circuit 102 is activated when the phone connection detection unit 111 detects that the cellular phone 200 is put on the charging stand 100 based on the depression of the projection 207, and deactivated otherwise. The transformer 103 does not function in a deactivated state. With this structure, unless some object to be authenticated is put on the charging stand 100 and depresses the projection 207, the IC-card-authentication-unit power supply 10 and the IC card authentication unit 11 are in a deactivated state and therefore do not consume any power.

The other switching circuit 109 is activated when the phone connection detection unit 111 detects that the cellular phone 200 is put on the charging stand 100 based on the depression of the projection 207 and the control unit 106 receives a response indicating an authentication OK result from the IC card reader 107, and deactivated otherwise. The primary side charging circuit 12 does not function in a deactivated state. Therefore, when the switching circuit 102 is in an activated state and an authentication result from the IC card reader 107 is NG, the switching circuit 109 is not activated. Consequently, the charging circuit does not operate for an arbitrary foreign object unless a correct cellular phone 200 is put on the charging stand 100.

Figure 2:
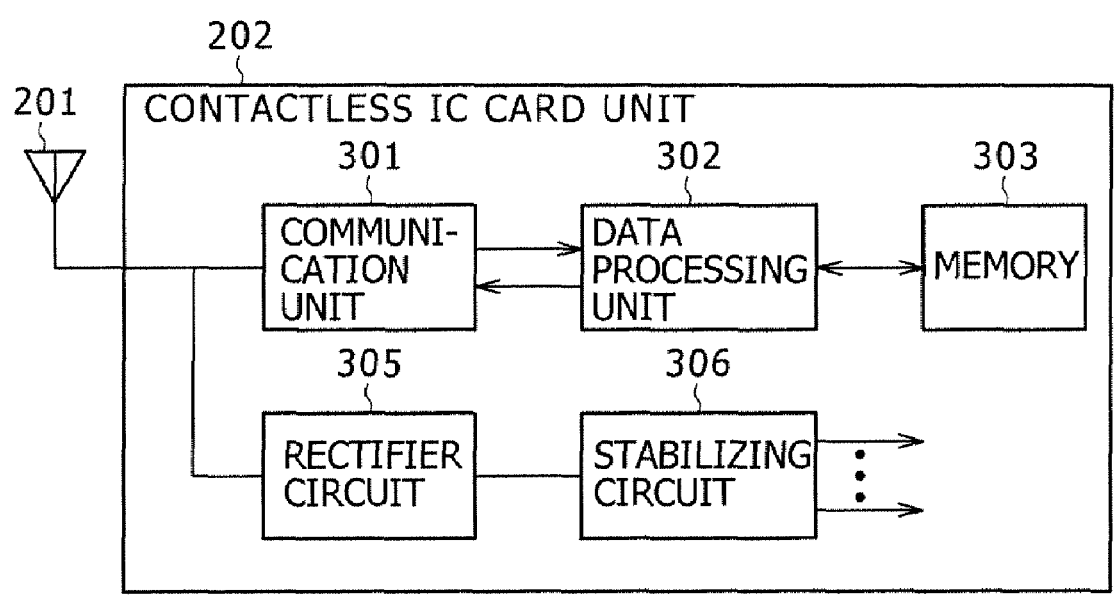
FIG. 2 is a block diagram showing an example of the configuration of a contactless IC card unit shown in FIG. 1.

FIG. 2 shows an example of the configuration of the contactless IC card unit 202. The contactless IC card unit 202 includes a communication unit 301 which is connected to the antenna and performs information communication, a data processing unit 302 which performs predetermined processing of data transmitted or received at the communication unit 301, a memory 303 from/to which the data processing unit 302 reads/writes data, a rectifier circuit 305 which rectifies a signal received by the antenna 201, and a stabilizing circuit 306 which stabilizes the output of the rectifier circuit 305. The stabilizing circuit 306 supplies operating voltage for verification of the contactless IC card unit 202.

Figure 3:
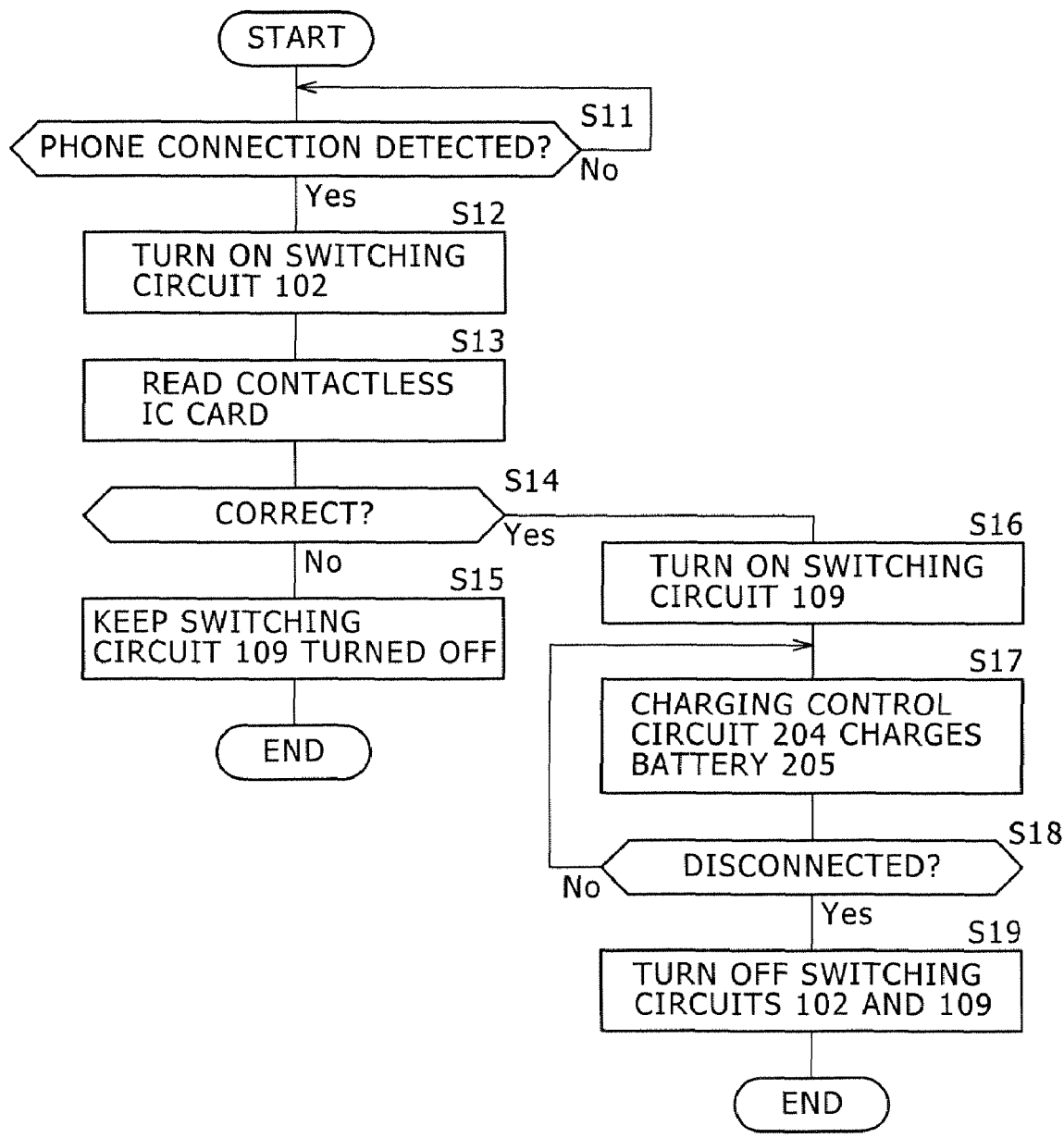
FIG. 3 is a flowchart illustrating a specific operating procedure of a system in an embodiment according to the invention.

Next, description will made of a specific operating procedure of this system including user operation, with reference to the flowchart of FIG. 3.

(1) First, a user connects the charging stand 100 to a commercial power source. At this time, the switching circuit 102 and the switching circuit 109 have not yet been activated.

(2) When the cellular phone 200 is put on the charging stand 100 correctly, the projection 207 is pressed and the phone connection detection unit 111 goes into a detection state (S11). That is, the switch is turned on so that the phone connection detection unit 111 activates the switching circuit 102 (S12). Thus, the contactless-IC-card-authentication-unit power supply 10 supplies power to the contactless IC card authentication unit 11. At this time, the switching circuit 109 is still in an OFF state.

(3) When power is supplied to the contactless IC card authentication unit 11, the control unit 106 performs predetermined communication with the contactless IC card unit 202 through the contactless IC card reader 107 via the antenna 108 and the antenna 201 and performs control in such a manner that the contactless IC card reader 107 reads information from the contactless IC card unit 202 (S13). At this time, even though the contactless IC card unit itself is not provided with a power source, power is supplied from the reader side, thereby making it possible to perform the authentication processing of the contactless IC card unit 202, independent of the amount of electricity remaining in the battery 205 of the cellular phone 200.

(4) If it is verified that the cellular phone 200 is a correct one (S14, Yes), the control unit 106 activates the switching circuit 109 (S16), and controls the contactless IC card reader 107 into a low-power mode to reduce the power consumption. If the cellular phone 200 is not a correct one or the object put on the charging stand 100 is a foreign object (S14, No), the control unit 106 does not activate the switching circuit 109 (S15). In this case too, the control unit 106 controls the contactless IC card reader 107 into the low-power mode to reduce the power consumption.

(5) In accordance with the operation of the switching circuit 109, the coil 110 of the primary side charging circuit 12 and a coil 206 of the secondary side charging circuit 21 are electromagnetically coupled together, thereby supplying power to the coil 206 side. A charging control circuit 204 after a smoothing circuit 203 in the secondary side charging circuit 21 charges the secondary battery 205 (S17).

(6) If the cellular phone 200 is removed from the charging stand 100 (S18, Yes), the depression of the projection 207 is released and the phone connection detection unit 111 goes into a non-detection state. Thereby, a control signal to the switching circuit 102 and the switching circuit 109 is turned off so that the switching circuit 102 and the switching circuit 109 are deactivated (S19). As a result, the charging operation ends.

Thus, in this embodiment, due to a plurality of verification steps having a first step of detecting that the cellular phone 200 is put on the charging stand 100 correctly and a second step in which the contactless IC card authentication unit 11 performs authentication operation when it is detected that the cellular phone 200 is put on the charging stand 100, it is possible to reduce the power consumption of the charging stand 100 and prevent improper activation for a foreign object.

As a modification of this embodiment, in the case of a charging apparatus that supports a portable electronic device of a different charging system, by receiving identification information for identifying a charging system such as manufacturer information and model information about the portable electronic device from the contactless IC card unit 202 at the time of authentication, the control unit can also drive the primary side charging circuit according to the different charging system, based on the identification information.

While a preferred embodiment of the invention has been described, it should be understood by those skilled in the art that various modifications, combinations, sub-combinations and alterations may occur depending on design requirements and other factors insofar as they are within the scope of the appended claims or the equivalents thereof.

What is claimed is:

1. A charging apparatus for charging a secondary battery incorporated in a portable electronic device, the charging apparatus comprising:
a contactless IC card reader configured to supply operating power to a contactless IC card unit incorporated in the portable electronic device and including an authentication function to verify whether the portable electronic device is to be supplied with the operating power;
a power supply circuit configured to supply the operating power to the contactless IC card reader;
a detection unit configured to detect whether the portable electronic device is in contact with the charging apparatus to produce a detection result;
a switching circuit configured to deactivate the power supply circuit when the portable electronic device is not in contact with the charging apparatus and to activate the power supply circuit when the portable electronic device is in contact with the charging apparatus, according to the detection result produced by the detection unit;
a charging circuit configured to perform a contactless charging of the secondary battery; and
a control unit configured to activate the charging circuit when the switching circuit activates the power supply circuit to supply the operating power to the contactless IC card reader and the contactless IC card reader verifies that the portable electronic device is to be supplied with the operating power, and to not activate the charging circuit when the contactless IC card reader does not verify that the portable electronic device is to be supplied with the operating power.

2. The charging apparatus according to claim 1, wherein the control unit is configured to allow the contactless IC card reader to operate in a low-power mode after a start of charging.

3. A charging system, comprising:
a portable electronic device; and
a charging apparatus configured to charge the portable electronic device, wherein
the portable electronic device includes,
a secondary battery to be charged,
a secondary side charging circuit configured to charge the secondary battery, and
a contactless IC card unit, and
the charging apparatus includes,
a contactless IC card reader configured to supply operating power to the contactless IC card unit and including an authentication function to verify whether the portable electronic device is to be supplied with the operating power,
a primary side charging circuit configured to perform a contactless charging of the secondary battery,
a power supply circuit configured to supply the operating power to the contactless IC card reader;
a detection unit configured to detect whether the portable electronic device is in contact with the charging apparatus to produce a detection result;
a switching circuit configured to deactivate the power supply circuit when the portable electronic device is not in contact with the charging apparatus and to activate the power supply circuit when the portable electronic device to be authenticated is in contact with the charging apparatus, according to the detection result produced by the detection unit; and
a control unit configured to activate the primary side charging circuit when the switching circuit activates the power supply circuit to supply the operating power to the contactless IC card reader and the contactless IC card reader verifies that the portable electronic device is to be supplied with the operating power when the detection unit detects that the portable electronic device is in contact with the charging apparatus, and to not activate the charging circuit when the contactless IC card reader does not verify that the portable electronic device is to be supplied with the operating power.

4. The charging system according to claim 3, wherein the control unit of the charging apparatus is configured to allow the contactless IC card reader to operate in a low-power mode after a start of charging.

5. The charging apparatus according to claim 1, wherein the authentication function is independent of an amount of electricity remaining in the secondary battery of the portable electronic device.

6. The charging apparatus according to claim 1, further comprising:
a contactless-IC-card-authentication-unit power supply connected to an output of a rectifier circuit and configured to supply power to the contactless IC card reader, wherein the contactless IC card reader is configured to verify whether the portable electronic device is to be supplied with the operating power by performing a predetermined communication with the contactless IC card unit.

7. The charging apparatus according to claim 6, wherein the contactless-IC-card-authentication-unit power supply and the contactless IC card reader are in a deactivated state when a projection on a charging stand of the charging apparatus is not depressed.

8. The charging system according to claim 3, wherein the authentication function is independent of an amount of electricity remaining in the secondary battery of the portable electronic device.

9. The charging system according to claim 3, further comprising:
a contactless-IC-card-authentication-unit power supply connected to an output of a rectifier circuit and configured to supply power to the contactless IC card reader, wherein the contactless IC card reader is configured to verify whether the portable electronic device is to be supplied with the operating power by performing a predetermined communication with the contactless IC card unit.

10. The charging system according to claim 3, wherein the contactless-IC-card-authentication-unit power supply and the contactless IC card reader are in a deactivated state when a projection on a charging stand of the charging apparatus is not depressed.

11. The charging apparatus according to claim 1, wherein the contactless IC card reader is further configured to communicate to a contactless IC card in the portable electronic device.

12. The charging apparatus according to claim 1, wherein the contactless IC card reader is further configured to read information from the contactless IC card unit to verify whether the portable electronic device is to be supplied with the operating power.

* * * * *